(12) United States Patent
Tanaka et al.

(10) Patent No.: US 7,110,863 B2
(45) Date of Patent: Sep. 19, 2006

(54) POWER GENERATING UNIT GENERAL MONITOR/CONTROL APPARATUS

(75) Inventors: Toshihiko Tanaka, Kanagawa-ken (JP); Hiroshi Fukuda, Tokyo (JP); Jin Murata, Kanagawa-ken (JP); Toshihiro Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/508,535

(22) PCT Filed: Mar. 28, 2003

(86) PCT No.: PCT/JP03/03981

§ 371 (c)(1),
(2), (4) Date: Mar. 18, 2005

(87) PCT Pub. No.: WO03/083592

PCT Pub. Date: Oct. 9, 2003

(65) Prior Publication Data

US 2005/0159826 A1 Jul. 21, 2005

(30) Foreign Application Priority Data

Mar. 28, 2002 (JP) ............................. 2002-090293

(51) Int. Cl.
*G05D 11/00* (2006.01)
(52) U.S. Cl. .................... 700/286; 700/22; 700/287
(58) Field of Classification Search ........ 700/286–287, 700/295, 83, 9, 22; 345/1.1; 340/3.1
See application file for complete search history.

(56) References Cited

U.S. PATENT DOCUMENTS 4,280,060 A * 7/1981 Kure-Jensen et al. ..... 290/40 R
5,249,260 A * 9/1993 Nigawara et al. .............. 706/45
5,777,896 A * 7/1998 Arita et al. .................. 702/185
6,901,299 B1 * 5/2005 Whitehead et al. ........... 700/22
2002/0029097 A1 * 3/2002 Pionzio et al. .............. 700/286
2002/0089234 A1 * 7/2002 Gilbreth et al. ............... 307/80

FOREIGN PATENT DOCUMENTS

| JP | 3-82347     | 11/1992 |
| JP | 11-328119   | 11/1999 |
| JP | 11-356094   | 12/1999 |
| JP | 2001-273031 | 10/2001 |
| JP | 2001-290530 | 10/2001 |
| JP | 2001-290533 | 10/2001 |

(Continued)

*Primary Examiner*—Leo Picard
*Assistant Examiner*—Alexander Kosowski
(74) *Attorney, Agent, or Firm*—Oblon, Spivak, McClelland, Maier & Neustadt, P.C.

(57) ABSTRACT

A generation unit general monitor-control system for generally monitoring and controlling electric power generation units (A-3 etc.), the general monitor-control system allocating relations between the electric power generation units and interface devices (11) for monitoring and controlling the generation units. The monitor-control system includes: a unit database (13) storing process data and operation signals; process input-output means (14) for reading out the data from this unit database and outputting the data to the generation units; unit database input-output portion (12) for receiving demands from the interface devices, detecting addresses of the generation units allotted to the interface devices, and referring to data corresponding to the addresses; interface device designating means (22) for designating interface devices; and an interface-device-unit-relation rewriting device (18) for rewriting the allocation relation between the generation unit and the interface devices based upon command from the interface device designating means.

7 Claims, 13 Drawing Sheets

FOREIGN PATENT DOCUMENTS

| | | |
|---|---|---|
| JP | 2002-215227 | 7/2002 |
| JP | 2002-251213 | 9/2002 |

\* cited by examiner

UNIT DATABASE
REFERENCE DATABASE                16

| GENERATION UNIT | UNIT DATABASE REFERENCE ADDRESS |
|---|---|
| A-1 | 34C4-2A10 |
| A-2 | 34D4-2A10 |
| A-3 | 34E4-2A10 |
| B-1 | 34F4-2A10 |
| B-2 | 35A4-2A10 |
| C-1 | 35B4-2A10 |
| C-2 | 35C4-2A10 |
| C-3 | 35D4-2A10 |
| C-4 | 35E4-2A10 |
| C-5 | 36F4-2A10 |

I/F MANAGEMENT DATABASE 17

| I/F | ALLOCATED GENERATION UNIT | UNIT OPERATION STATE | AUTOMATIC PRIORITY | AUTOMATIC ALLOCATION | I/F SWITCH MSG FLAG |
|---|---|---|---|---|---|
| 1 | B-2 | NO-OPERATION | 9 | NO | 0 |
| 2 | A-2 | NO-OPERATION | 1 | NO | 0 |
| 3 | A-3 | START/STOP | 3 | OK | 0 |
| 4 | A-3 | START/STOP | 5 | OK | 0 |
| 5 | C-4 | START/STOP | 7 | NO | 0 |
| 6 | C-4 | START/STOP | 8 | NO | 0 |
| 7 | C-3 | START/STOP | 6 | NO | 0 |
| 8 | C-3 | START/STOP | 4 | OK | 0 |
| 9 | A-1 | NORMAL OPERATION | 2 | OK | 0 |
| 10 | B-2 | NORMAL OPERATION | 10 | NO | 0 |

FIG. 5

UNIT STATE DATABASE 24

| OPERATION UNIT | UNIT STATE |
|---|---|
| A-1 | NORMAL OPERATION |
| A-2 | NO-OPERATION |
| A-3 | NO-OPERATION |
| B-1 | NO-OPERATION |
| B-2 | NORMAL OPERATION |
| C-1 | NO-OPERATION |
| C-2 | NO-OPERATION |
| C-3 | START/STOP |
| C-4 | START/STOP |
| C-5 | NO-OPERATION |

FIG. 4

OPERATION MANAGEMENT DATABASE 21

| OPERATOR NUMBER | OPERABLE UNIT |
|---|---|
| No. 1 | A-1,2,3,B-1,2 |
| No. 2 | A-1,2,3,B-1,2 |
| No. 3 | A-1,2,3,B-1,2 |
| No. 4 | B-1,2,C-1,2,3,4,5 |
| No. 5 | A-1,2,3,B-1,2 |
| No. 6 | A-1,2,3,B-1,2 |
| No. 7 | B-1,2,C-1,2,3,4,5 |
| No. 8 | A-1,2 |
| No. 9 | A-1,2 |
| No. 10 | B-1,2,C-1,2,3,4,5 |

ALLOCATION PATTERN TABLE FIG. 7

| PATTERN NO. | NUMBER OF UNITS | | | NUMBER OF ALOCATED CRTS | | | NUMBER OF UNITS/ NUMBER OF CRTS | | |
|---|---|---|---|---|---|---|---|---|---|
| | START/ STOP | NORMAL OPERATION | NO OPERATION | START/ STOP | NORMAL OPERATION | NO OPERATION | START/ STOP | NORMAL OPERATION | NO OPERATION |
| 1 | 4 | 6 | 0 | 8 | 2 | 0 | 0.50 | 3.00 | - |
| 2 | 4 | 5 | 1 | 8 | 1 | 1 | 0.50 | 5.00 | 1.00 |
| 3 | 4 | 4 | 2 | 8 | 1 | 1 | 0.50 | 4.00 | 2.00 |
| 4 | 4 | 3 | 3 | 8 | 1 | 1 | 0.50 | 3.00 | 3.00 |
| 5 | 4 | 2 | 4 | 8 | 1 | 1 | 0.50 | 2.00 | 4.00 |
| 6 | 4 | 1 | 5 | 8 | 1 | 1 | 0.50 | 1.00 | 5.00 |
| 7 | 4 | 0 | 6 | 8 | 0 | 2 | 0.50 | - | 3.00 |
| 8 | 3 | 7 | 0 | 6 | 4 | 0 | 0.50 | 1.75 | - |
| 9 | 3 | 6 | 1 | 6 | 3 | 1 | 0.50 | 2.00 | 1.00 |
| 10 | 3 | 5 | 2 | 6 | 3 | 1 | 0.50 | 1.67 | 2.00 |
| 11 | 3 | 4 | 3 | 6 | 3 | 1 | 0.50 | 1.33 | 3.00 |
| 12 | 3 | 3 | 4 | 6 | 3 | 1 | 0.50 | 1.00 | 4.00 |
| 13 | 3 | 2 | 5 | 6 | 2 | 2 | 0.50 | 1.00 | 2.50 |
| 14 | 3 | 1 | 6 | 6 | 1 | 3 | 0.50 | 1.00 | 2.00 |
| 15 | 3 | 0 | 7 | 6 | 0 | 4 | 0.50 | - | 1.75 |
| 16 | 2 | 8 | 0 | 4 | 6 | 0 | 0.50 | 1.33 | - |
| 17 | 2 | 7 | 1 | 4 | 5 | 1 | 0.50 | 1.40 | 1.00 |
| 18 | 2 | 6 | 2 | 4 | 5 | 1 | 0.50 | 1.20 | 2.00 |
| 19 | 2 | 5 | 3 | 4 | 5 | 1 | 0.50 | 1.00 | 3.00 |
| 20 | 2 | 4 | 4 | 4 | 4 | 2 | 0.50 | 1.00 | 2.00 |
| 21 | 2 | 3 | 5 | 4 | 3 | 3 | 0.50 | 1.00 | 1.67 |
| 22 | 2 | 2 | 6 | 4 | 2 | 4 | 0.50 | 1.00 | 1.50 |
| 23 | 2 | 1 | 7 | 4 | 1 | 5 | 0.50 | 1.00 | 1.40 |
| 24 | 2 | 0 | 8 | 4 | 0 | 6 | 0.50 | - | 1.33 |
| 25 | 1 | 9 | 0 | 2 | 8 | 0 | 0.50 | 1.13 | - |
| 26 | 1 | 8 | 1 | 2 | 7 | 1 | 0.50 | 1.14 | 1.00 |
| 27 | 1 | 7 | 2 | 2 | 7 | 1 | 0.50 | 1.00 | 2.00 |
| 28 | 1 | 6 | 3 | 2 | 6 | 2 | 0.50 | 1.00 | 1.50 |
| 29 | 1 | 5 | 4 | 2 | 5 | 3 | 0.50 | 1.00 | 1.33 |
| 30 | 1 | 4 | 5 | 2 | 4 | 4 | 0.50 | 1.00 | 1.25 |
| 31 | 1 | 3 | 6 | 2 | 3 | 5 | 0.50 | 1.00 | 1.20 |
| 32 | 1 | 2 | 7 | 2 | 2 | 6 | 0.50 | 1.00 | 1.17 |
| 33 | 1 | 1 | 8 | 2 | 1 | 7 | 0.50 | 1.00 | 1.14 |
| 34 | 1 | 0 | 9 | 2 | 0 | 8 | 0.50 | - | 1.13 |
| 35 | 0 | 10 | 0 | 0 | 10 | 0 | - | 1.00 | - |
| 36 | 0 | 9 | 1 | 0 | 9 | 1 | - | 1.00 | 1.00 |
| 37 | 0 | 8 | 2 | 0 | 8 | 2 | - | 1.00 | 1.00 |
| 38 | 0 | 7 | 3 | 0 | 7 | 3 | - | 1.00 | 1.00 |
| 39 | 0 | 6 | 4 | 0 | 6 | 4 | - | 1.00 | 1.00 |
| 40 | 0 | 5 | 5 | 0 | 5 | 5 | - | 1.00 | 1.00 |
| 41 | 0 | 4 | 6 | 0 | 4 | 6 | - | 1.00 | 1.00 |
| 42 | 0 | 3 | 7 | 0 | 3 | 7 | - | 1.00 | 1.00 |
| 43 | 0 | 2 | 8 | 0 | 2 | 8 | - | 1.00 | 1.00 |
| 44 | 0 | 1 | 9 | 0 | 1 | 9 | - | 1.00 | 1.00 |
| 45 | 0 | 0 | 10 | 0 | 0 | 10 | - | - | 1.00 |

FIG. 8

I/F MANAGEMENT DATABASE

| I/F | ALLOCATED GENERATION UNIT | UNIT OPERATION STATE | AUTOMATIC PRIORITY | AUTOMATIC ALLOCATION | I/F SWITCH MSG FLAG |
|---|---|---|---|---|---|
| 1 | A-2, B-1 | NO OPERATION | 1 | OK | 0 |
| 2 | C-1, C-2, C-3 | NO OPERATION | 1 | OK | 0 |
| 3 | A-3 | START/STOP | 1 | OK | 0 |
| 4 | A-3 | START/STOP | 1 | OK | 0 |
| 5 | C-4 | START/STOP | 1 | OK | 0 |
| 6 | C-4 | START/STOP | 1 | OK | 0 |
| 7 | C-3 | START/STOP | 1 | OK | 0 |
| 8 | C-3 | START/STOP | 1 | OK | 0 |
| 9 | A-1 | NORMAL OPERATION | 1 | OK | 0 |
| 10 | B-2 | NORMAL OPERATION | 1 | OK | 0 |

FIG. 9A

TRANSITION OF CRT ALLOCATION
(1) ORIGINAL OPERATION STATE
[START/STOP: 3; NORMAL OPERATION: 2; NO-OPERATION: 5] → ALLOCATION PATTERN NO.13

| ALLOCATED UNITS | CRT01 | CRT02 | CRT03 | CRT04 | CRT05 | CRT06 | CRT07 | CRT08 | CRT09 | CRT10 |
|---|---|---|---|---|---|---|---|---|---|---|
| | A-2<br>B-1 | C-1<br>C-2<br>C-5 | A-3 | A-3 | C-4 | C-4 | C-3 | C-3 | A-1 | B-2 |
| | FOR MONITORING AND CONTROLLING UNITS OF START/STOP | | FOR MONITORING AND CONTROLLING UNITS OF START/STOP | | | | | | FOR MONITORING AND CONTROLLING UNITS OF NORMAL OPERATION | |

FIG. 9B

(2) UNIT A-2 CHANGED FROM NO-OPERATION STATE TO START/STOP STATE WITH INITIATION OF PLANT START
[START/STOP: 4; NORMAL OPERATION: 2;NO-OPERATION: 4]→ALLOCATION PATTERN NO.5

| ALLOCATED UNITS | CRT01 | CRT02 | CRT03 | CRT04 | CRT05 | CRT06 | CRT07 | CRT08 | CRT09 | CRT10 |
|---|---|---|---|---|---|---|---|---|---|---|
|  |  |  |  |  |  |  |  |  |  |  |
|  | B-1<br>C-1<br>C-2<br>C-5 | A-2 | A-2 | A-3 | A-3 | C-4 | C-4 | C-3 | C-3 | A-1<br>B-2 |
|  | FOR MONITORING AND CONTROLLING UNITS OF START/STOP | | FOR MONITORING AND CONTROLLING UNITS OF START/STOP | | | | | | | FOR MONITORING AND CONTROLLING UNITS OF NORMAL OPERATION |

FIG.9C (2) UNIT C-3 OF STARTING OPERATION CHANGED INTO NORMAL OPERATION WITH STARTING COMPLETED
[START/STOP: 3; NORMAL OPERATION: 3;NO-OPERATION: 4]→ ALLOCATION PATTERN NO.12

| | CRT01 | CRT02 | CRT03 | CRT04 | CRT05 | CRT06 | CRT07 | CRT08 | CRT09 | CRT10 |
|---|---|---|---|---|---|---|---|---|---|---|
| ALLOCATED UNITS | B-1<br>C-1<br>C-2<br>C-5 | A-2 | A-2 | A-3 | A-3 | C-4 | C-4 | C-3 | A-1 | B-2 |
| | FOR MONITORING AND CONTROLLING UNITS OF START/STOP | FOR MONITORING AND CONTROLLING UNITS OF START/STOP | | | | | | FOR MONITORING AND CONTROLLING UNITS OF NORMAL OPERATION | | |

POWER GENERATING UNIT GENERAL MONITOR/CONTROL APPARATUS

TECHNICAL FIELD

This invention is related to a general monitor-control system for generally monitoring and controlling a plurality of electric power generation units.

BACKGROUND ART

In conventional power generation systems, each generation unit in power generation plants is controlled separately. For example, each of the generation units has teams of five or six operators, and the teams take turns in duty, so as to quickly cope with abnormal incidents. Since operation automation in the power generation stations has advanced, the number of operators required for each generation unit has decreased.

However, the operation management system for each generation unit still remains persistently, which results in increase required number of operators proportionately to the scale of the power generation stations (or the number of the generation units.

In order to improve such a s situation, a general monitor-control system has been proposed as disclosed in the Japanese Patent Application Publication 11-356094. By this system, a plurality of generation units of a plurality of power generation plants are monitored and controlled with fewer operators more efficiently and safely.

However, there is fear that the operators may take wrong subjects to be monitored and controlled by mistake, because a same monitor-control system can monitor and control a plurality of generation units. To prevent operation mistakes, a a single man-machine interface might be allocated for each generation unit so as to monitor and control the generation unit in one-to-one basis. However, such a system would require many display devices for all generation units, which would require wide area for arranging the display devices and would cost much.

The operators and the general monitor-control system might be divided into groups of the similar operation states of the generation units and the grouping might be changed depending on the change in operation states. However, such grouping would cause mistakes in operation and recognition, because the disclosed general monitor-control system does not have functions adapted for such grouping.

Accordingly, it is an object of the present invention to provide general monitor-control system, which can monitor and control a plurality of electric power generation units with smaller number of operators efficiently and safely.

DISCLOSURE OF INVENTION

In order to achieve the above-described objective, there has been provided, in accordance with an aspect of the present invention, a generation unit general monitor-control system for generally monitoring and controlling a plurality of electric power generation units, the general monitor-control system allocating relations between a plurality of electric power generation units and a plurality of man-machine interface devices for monitoring and controlling the generation units so as to generally monitor and control the generation units through the man-machine interface devices. The general monitor-control system includes: a unit database including addresses stipulated for each of the generation units, and data portions corresponding to each of the addresses, the data portions configured to store process data and operation signals of the generation units; process input-output means for rewriting data in the data portion based upon input signals from the generation units, reading out the data in the data portion based upon demand from the man-machine interface device, and outputting the data to the generation units; unit database input-output portion for receiving demands from the man-machine interface devices, detecting addresses of the generation units allotted to the man-machine interface devices, and referring to data portion corresponding to the addresses; interface device designating means for designating man-machine interface devices out of the plurality of man-machine interface devices; and an interface-device-unit-relation rewriting device for rewriting the allocation relation between the generation unit and the man-machine devices based upon command from the interface device designating means.

BRIEF DESCRIPTION OF DRAWINGS

FIG. 2 is a table showing an example of the unit database reference database of the general monitor-control system for power generation units shown in FIG. 1;

FIG. 3 is a table showing an example of the interface management database of the general monitor-control system of power generation units shown in FIG. 1;

FIG. 4 is a table showing an example of the operator management database of the general monitor-control system of power generation units shown in FIG. 1;

FIG. 5 is a table showing an example of the unit state database of the general monitor-control system of power generation units shown in FIG. 1;

FIG. 7 is a table showing an example of an allocation pattern for the general monitor-control system of power generation units shown in FIG. 1;

FIG. 8 is a table showing an example of the interface management database of the general monitor-control system of power generation units shown in FIG. 1, the database different from that shown in FIG. 3; and FIG. 9 is a diagram showing an example of a change in interface device allocation caused by a change in plant state in the general monitor-control system of power generation units shown in FIG. 1, the example different from that shown in FIG. 6.

BEST MODE FOR CARRYING OUT THE INVENTION

An embodiment of a general monitor-control system according to the present invention is now described with reference to drawings.

Figure 1A:
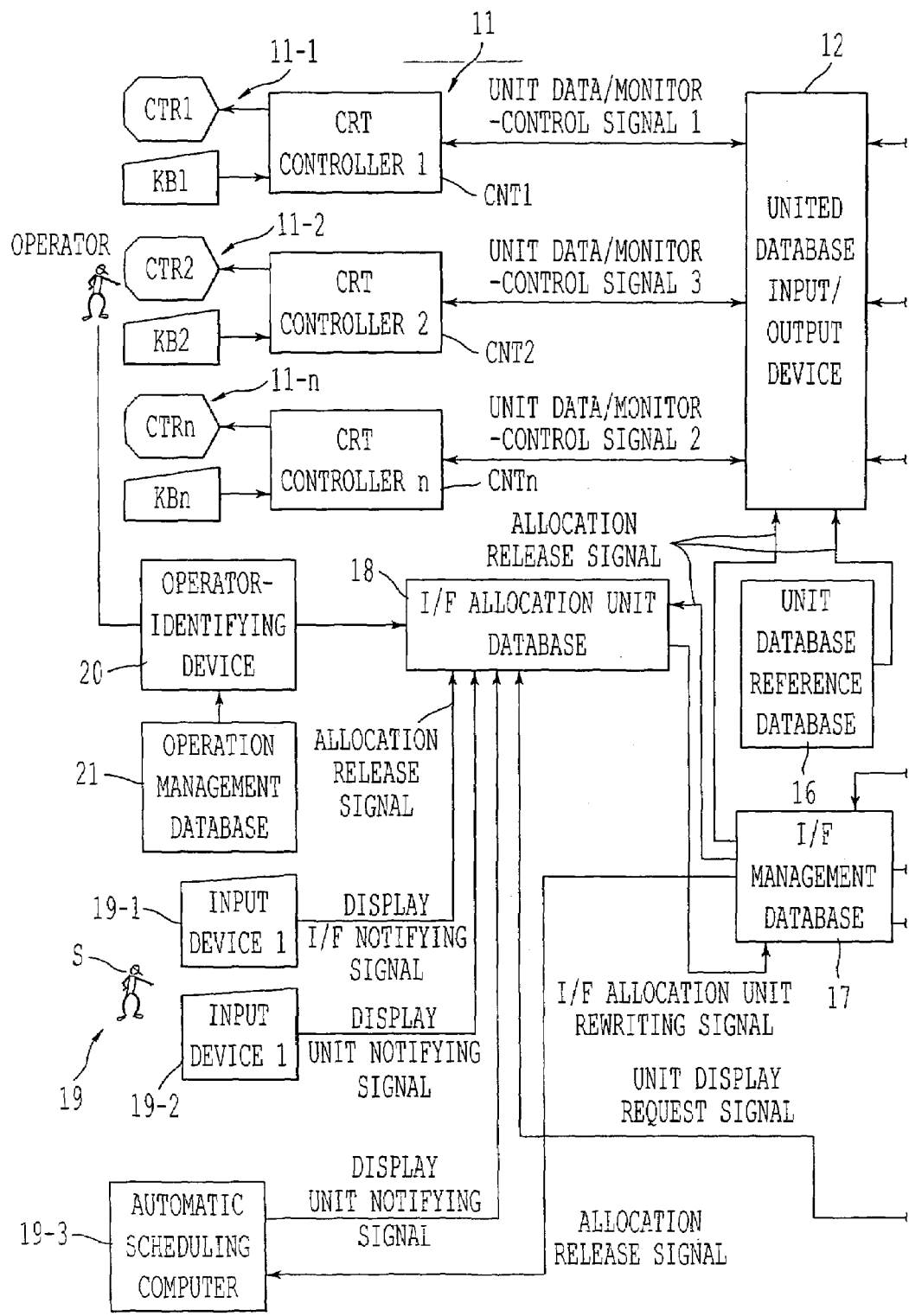
FIG. 1 is a functional block diagram of an embodiment of a general monitor-control system of power generation units according to the present invention.
Figure 1B:
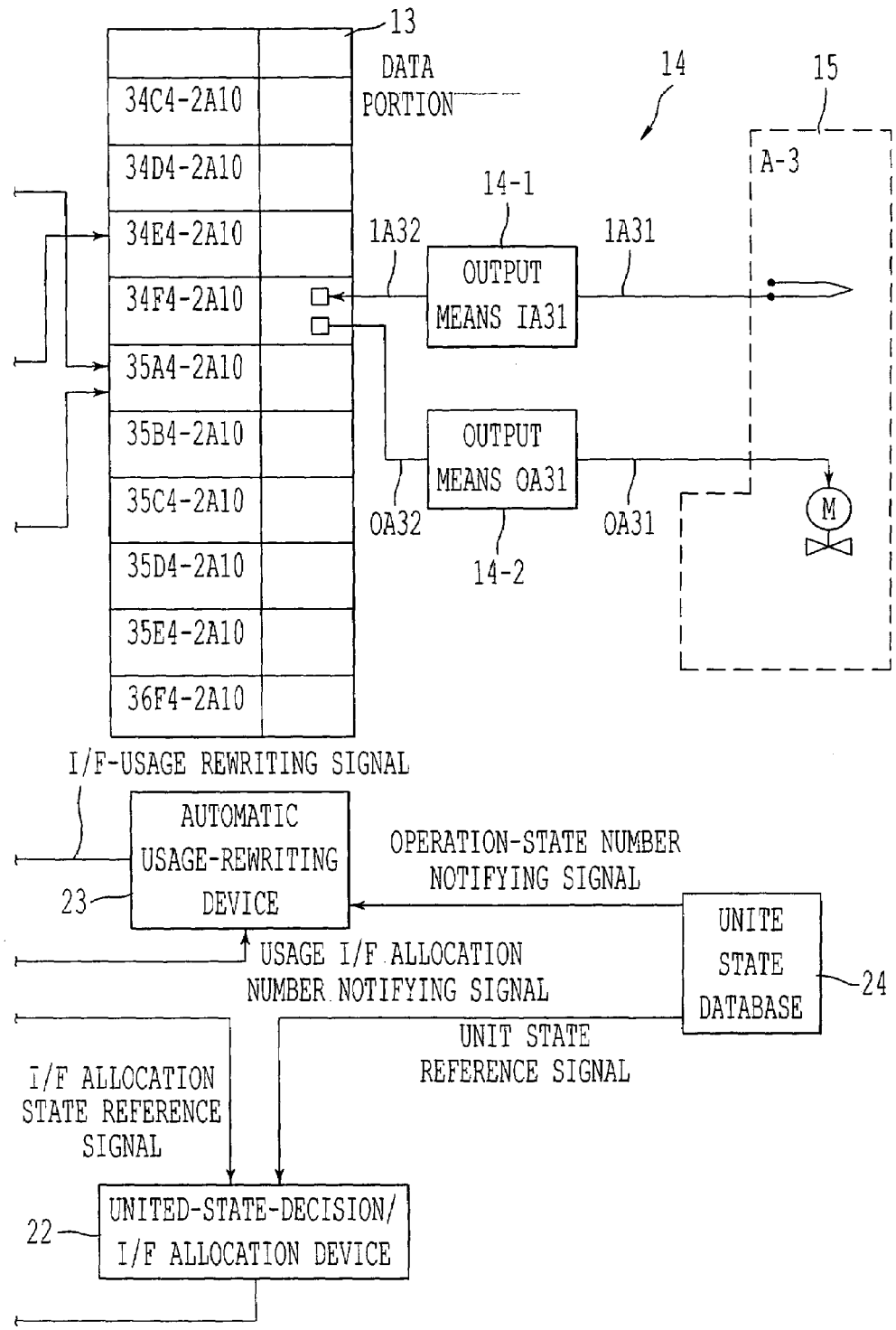

FIG. 1 is a functional block diagram of the general monitor-control system according to the present invention. In this system, a plurality of man-machine interface devices 11 monitors and controls a plurality of power generation units. Any of the interface devices 11 can be allocated to any of a plurality of power generation units. The allocation can be changed in many ways, and some of the allocation changes may be prohibited in some way.

In the embodiment shown here, ten interface devices and ten power generation units are installed. And a power generation supervisor S and ten operators OP (No. 1 to 10) are assigned for operation. In the drawings, A-1, A-2, A-3, B-1, B-2 and C-1 to C-5 each denotes a generation unit, wherein A, B and C denote power generation stations and the numerals 1 to 5 denote numbers of generation units in the power generation stations.

In the following description, the monitor-control system monitors and controls a plurality of generation units located in a plurality of power generation stations. However, the system alternatively may monitor and control a plurality of generation units located in a single power generation station. Furthermore, the system may monitor and control a plurality of sets of generation units, the sets being selected from different power generation stations, for example.

The devices and the operators may be located far from or near any of the generation units. A "Supervisor S" and an "Operator OP" are termed for their functions. The supervisor S and one of the operators OP can be the same person.

Summary of this embodiment is now described referring to FIG. 1. First, allocation of interface devices (I/F) 11-1 through 11-n to the generation units A-1, A-2, A-3, B-1, B-2 and C-1 to C-5 is explained. The interface devices 11-1 through 11-n are disposed in a central operation room where an operator OP is in place. The interface devices 11-1 through 11-n monitor and control the generation units A-1, A-2, A-3, B-1, B-2 and C-1 to C-5. The interface devices 11-1 through 11-n include display devices CRT1 through CRTn, keyboards KB1 through KBn and CRT controller CNT1 through CNTn, respectively. The display devices CRT 1 through CRTn may be of any types such as CRTs, liquid crystal panels and plasma display panels.

Furthermore, the display devices CRT1 through CRTn may be touch-screens having touch-screen functions (or touch-operation functions) for operating the generation units by touching the screens on the display devices CRTs with fingers or pens to demand a display on the screen or to operate the generation units A-1, A-2, A-3, B-1, B-2 and C-1 to C-5. Furthermore, the interface devices 11-1 through 11-n may be operated with displayed screens and mice.

When a display demand or a control command is inputted by the key boards KB1 through KBn or touch operation on the display devices CRT1 through CRTn, the CRT controller CNT1 through CNTn outputs the display demand or the control command to the unit database input/output device 12.

Then, the unit database input/output device 12 refers to the addresses in the unit database 13 based upon the display demand or the control command, and retrieves the data stored in the data portion. Then, the unit database input/output device 12 outputs control demands to the generation units via the process input/output device 14, and displays the process data via the CRT controllers CNT1 through CNTn.

The unit database 13 is divided into a plurality of pairs of areas, each pair having an address and a data portion, corresponding to each of the generation units A-1 through C-5, as shown in the diagram. The process data and the operation signals are stored in the data portion. The codes shown in the column of the address in the unit database 12 in the diagram, such as "34C4-2A10" denote the leading addresses. The required data can be designated by designation of the relative pointers relative to the leading addresses.

FIG. 1 shows the data input/output situation between the generation unit A-3 and the unit database 13. The data input/output situations between the other generation units and the unit database 13 are not shown, but they are similar to the situation shown here.

In the embodiment shown here, the unit databases of all the generation units are of the same configuration. However, alternatively, the database configurations of the generation units may be different. In such a case, the relative address designation system may be replaced by absolute address designation system where absolute address of unit data at the unit database may be stored at the unit database reference address.

Numeral "14" denotes a well-known process input/output means (PI/0), which is connected between the generation unit (A-3) 15 and the unit database 13. The process input/output means 14 includes an input means 14-1 which receives a signal IA31 such as an output from a sensor, a controller or a computer in the generation unit A-3, and generates a writing signal IA32, by which the data in the data portion in the unit database 13 is rewritten.

On the other hand, the output means 14-2 reads out data OA32 in the data in the unit database 13, and generates an output signal OA31, which is outputted to the generation unit A-3. The generation unit (A-3) 15 controls the corresponding devices using the output signal OA31, or the generation unit A-3 controls itself using the output signal OA31 as a control command signal.

Now data exchange between the unit database input/output device 12 and the peripheral software is discussed, which takes place when the interface device 11 refers to the unit database 13.

First, the unit database input/output device 12 receives a monitor-control signal for a generation unit from the CRT controller CNT2 of the particular interface device 11-2. Then, an interface-device management database 17 (which will be described in detail later) is referred to, and a particular generation unit is identified which is allocated to the interface device 11-1 through 11-n. Then, the unit database reference database 16 is referred in order to obtain the corresponding address to change the data in the corresponding data portion. Then, the generation unit 15 is operated via the output means 14-2. In the drawings, "I/F" denotes an interface device.

In the unit database reference database 16, the relation between the power generation units Al, A-2, A-3, . . . , C-5 and the reference addresses 34C4-2A10, 34D4-2A10, 34E4-2A10, . . . , 36F4-2A10 of the unit database 13 is registered as shown in FIG. 2, for example. Thus, the addresses of the power generation units can be obtained when the names of the power generation units are referred to.

When a generation unit data display demand is inputted from the CRT controller CNT1, for example, to the unit database input/output device 12, the device 12 refers to the unit database reference database 16 to detect the address to which the data of the generation unit corresponding to the interface device 11-1 is allocated in the unit database 13. Then, the data portion corresponding to the address is referred to.

Then, the unit database input/output device 12 sends the obtained unit data to the CRT controller CNT1. Thus, the unit data is displayed on the display device.

Now the interface-device management database 17 is explained.

This interface-device management database 17 stipulates the operation modes of the interface devices (I/F) 11-1 through 11-10, such that the "allocated generation units" which the interface devices 11-1 through 11-10 can operate are stored, as shown in FIG. 3. In FIG. 3, the interface devices 11-1 through 11-10 are denoted as 1 through 10 in the "I/F" column, respectively. In this embodiment, the interface device 11-1 is allocated and registered beforehand to the generation unit B-2. Likewise, the interface devices 11-2, 11-3, . . . 11-10 are allocated to and registered to the generation units A-2, A-3, . . . , and B-2, respectively. Therefore, when the interface device 11-2 is operated and the interface management database 17 is referred to, for example, the name of the generation unit "A-2" is obtained which is allocated to the interface devices 11-2.

In the interface-device management database 17, automatic allocation conditions, which is described in detail later, for each interface device 11-1 through 11-n are also stored. The automatic allocation conditions include: "operation mode" such as "non-operation", "starting-stopping" or "normal operation"; "automatic allocation" permission; "automatic allocation priority" that is the priority order in which the automatic allocation should be conducted; and "interface device switching message (MSG) flag" which sends a message when the interface device looses the authority to operate the allocated generation unit.

If the "interface device switching message flag" is unity (1), the message is sent out when the authority over operating the generation unit is lost. If the "interface device switching message flag" is zero (0), the message is not sent out.

In the interface-device management database 17 shown in FIG. 3, four interface devices 11-3, 11-4, 11-8 and 11-9 are permitted to be automatically allocated, and the interface device 11-9 has the highest priority for being allocated among them. Therefore, the interface device 11-9 is first selected.

Now the interface-device-unit-relation rewriting device 18 is explained. This interface-device-unit-relation rewriting device 18 re-allocates the interface devices 11-1 through 11-n to the generation units by rewriting the interface-device management database 17.

The re-allocation of the generation units can be conducted manually by the interface device designating means 19, or alternatively, automatically. Manual re-allocation of the generation units is first explained. The supervisor S designates the interface devices using the interface device designation input device 19-1. Then, the supervisor S inputs the power generation unit names designated to the interface devices by another interface device designation input device 19-2.

The interface device designation input devices 19-1 and 19-2 output a display interface notifying signal "a" and a displayed generation unit notifying signal "b", in response to the respective inputs. The interface-device-unit-relation rewriting device 18 outputs an interface allocated generation unit rewriting signal "c" to the interface-device management database 17 based upon the display interface notifying signal "a" and the displayed generation unit notifying signal "b". Thus, the "allocated generation units" in this database corresponding to the interface devices are rewritten to the designated display unit.

The generation units may be alternatively allocated automatically using the automatic scheduling device 19-3. The automatic scheduling device 19-3 can calculate the required time period for achieving the state of parallel-off, parallel-in or operation at a target load at a desired time. The device 19-3 can set a schedule for starting and/or stopping operations, according to which the device 19-3 can display massages on the display devices of the interface device for the operators OP to be announced, so that the operators OP may conduct the starting or stopping operations.

If no interface device is allocated to the generation unit which should be operated for starting or stopping, one or more interface devices are allocated to the generation unit automatically, and a message prompting the operator to conduct starting or stopping operations is outputted. That is, the generation unit, which is allocated by the interface management database 17, is referred to. If none of the interface devices is allocated to the generation unit which should be operated for starting or stopping, the automatic scheduling device 19-3 sends out the displayed unit announcing signal "d" indicating the name of the generation unit which is to be allocated to an interface device.

The interface-device-unit-relation rewriting device 18 receives the displayed generation unit notifying signal "d", and refers to the interface-device management database 17, then, the device 18 chooses one of the interface devices 11-1 through 11-n in which "automatic allocation" is "OK" and which has the highest "automatic priority", and the "allocated generation unit" is rewritten by the allocated generation unit notified by the display unit notifying signal "d". In the embodiment shown in the drawings, the interface devices 11-3, 11-4, 11-8 and 11-9 are permitted to be allocated, and the interface device 11-9 has the highest priority among them, so that the interface devices 11-9 is allocated.

Thus, the automatic scheduling device 19-3 can allocate the generation unit to the interface device 11-9.

The automatic scheduling device 19-3 has been explained above as an example of a device for automatic allocation. The other types of devices, circuits or programs may be alternatively used for automatic allocation. For example, when an alarm, a trip signal or an event signal has been generated, the generation unit where the alarm or the signal has been generated may be automatically allocated.

The system according to this embodiment has an operator-identifying device 20 to enhance reliability of the monitoring and controlling. The operator-identifying device 20 identifies the operators who operate the interface devices 11-1 through 11-n. The operator-identifying device 20 makes a notice to have the interface-device-unit-relation rewriting device 18 allocate only the generation units over which the operator has the authority to operate.

The operator OP inputs the operator's own ID number—one of the numbers from 1 to 10, to the operator-identifying device using an input terminal device of an identifying device (not shown). Then, the operator OP can refer to the operator management database 21, and can identify the generation units, which the operator can operate, or the generator units over which the operator has the authority to operate. The operator management database 21 may have data of the operable generation units registered corresponding to each operator number. For example, Operator No. 1 can operate the generation units A-1, A-2, A-3, B-1 and B-2. Likewise, Operator No. 10 can operate the generation units B-1, B-2, C-1, C-2, C-3, C-4 and C-5.

When the interface-device-unit-relation rewriting device 18 changes or rewrites the generation units which are allocated to the interface devices 11-1 through 11-n, based upon the command from the interface device designation input device 19-1 or 19-2 or the automatic scheduling device 19-3, the device 18 refers to the operator-identifying device 20. The operator-identifying device 20 denies allocating generation units to the interface devices 11-1 through 11-n, if the interface device is operated by an operator who does not have the authority to operate the generation units.

The authority to operate may alternatively cover particular items such as "one-through boiler and drum boiler" or "gas turbine and steam turbine" rather than the whole generation unit. In such a case, operator-identifying device 20 may decide whether the operators have the authority o operate each item. In that case, a database is produced for storing the data identifying the particular items. The allocation is permitted only when the operator has all skills needed for operating the generation unit.

The interface devices 11-1 through 11-n may be alternatively allocated to only small items of a generation unit to be operated.

The system according to the present invention can be alternatively operated depending on management of the operators OP as disclosed below.

Suppose an operator is an expert with an authority for operation of the generation unit A-1 and another operator is an expert with an authority for operation of the generation unit B-2, for example. Each of the operators may have an operator number for each of the generation units the operator is an expert of. Thus, some operators each may have a plurality numbers and the summation of the numbers of the generation units the operators can operate equal to the summation of the numbers of the operator numbers.

Now the operation of the system is explained in a case where the allocation of the interface devices 11-1 through 11-n is rewritten due to a change in the generation unit operation mode.

The unit-state-decision-interface-device-allocation device 22 refers to the unit state database 24 shown in FIG. 5, for example, and receives a signal of changed generation unit state. Then the device 22 re-allocates the generation units to the interface devices 11-1 through 11-n for the usage (or the unit operation state), depending on the changed operation state or operation mode of the generation unit.

The generation unit A-2 may have been in non-operation state and have been allocated an interface device 11-2 which is allocated to the non-operation state, for example. Then, the generation unit A-2 may change from the "non-operation" state to a "starting" state. At that time, "unit state" of the generation unit A-2 would change to a "starting" state.

When the state in the unit state database 24 has changed, the unit-state-decision-interface-device-allocation device 22 refers to the interface-device management database 17 (or inputs an interface allocation state reference signal "e"), and searches for the interface devices where the unit operation states and the allocated generation units do not match.

In this example, it will be found that the "unit operation state" and the "allocated generation unit" do not match for the interface device 11-2 as a result of the search. Then, the unit-state-decision-interface-device-allocation device 22 outputs an allocation release signal "f" of the power generation unit A-2, which was allocated to the interface device 11-2, to the interface-device-unit-relation rewriting device 18. At the same time, the unit-state-decision-interface-device-allocation device 22 outputs a unit display demand signal "g" to the interface-device-unit-relation rewriting device 18 for demanding the allocation of the generation unit A-2.

The function of demanding the allocating the generation unit A-2 is similar to the automatic allocation function of the automatic scheduling device 19-3.

The interface-device-unit-relation rewriting device 18 receives the allocation demanding signal, and refers to the interface-device management database 17. Then, the device 18 searches the interface device that has the highest priority in automatic allocation, and change the allocation. In this example, the interface device 11-9 is chosen and allocated to the generation unit A-2.

Now the automatic usage-rewriting device 23 is described which sends an interface-unit-operation-state-rewrite signal "j" to the interface-device management database 17. The automatic usage-rewriting device 23 refers to the number of generation units in each operation state (or the operation-state-unit-number notifying signal "h") in the unit state database 24. The automatic usage-rewriting device 23 further refers to the number of allocated interface devices for each operation state of the generation units (or the announcement of the number of allocated interface device for each operation state of the generation units in the interface-device management database 17.

Now, support function of authority transition of monitoring and controlling is explained. The interface devices 11-1 through 11-n can be rewritten by the interface-device-unit-relation rewriting device 18 or by the automatic usage-rewriting device 23 as described above, then the interface devices may loose the authority to operate the generation units which were displayed on the interface devices so far. Then, the interface-device management database 17 changes the "interface switching message (MSG) flag" to unity (1), and the corresponding CRT controller CNT displays a popup message on the display device CRT2 announcing the loss of operation authority.

The system may optionally require the operator OP who has used the display device CRT to confirm the loss of operation authority by pushing a confirmation button, for example, in addition to announcement of operation authority loss. Thus, operation mistake of the operator, who has not noticed that the operator's interface device changed its subject generation units, would be prevented. In such a case, the system may certify the operator has the authority to operate the generation unit by detecting the operator's physical characteristics such as finger print, voice print or palm print. Alternatively, the system may certify the authority using memory devices such as IC cards or barcode cards which authorize the bearers to operate the generation units.

The display device CRT2 may announce the loss of operation authority by a popup message while the display device CRT9 may display a popup message announcing the acquisition of operation authority. The system may require identification of the operators of the old and new display devices CRT2 and CRT9 both.

Figure 6A:
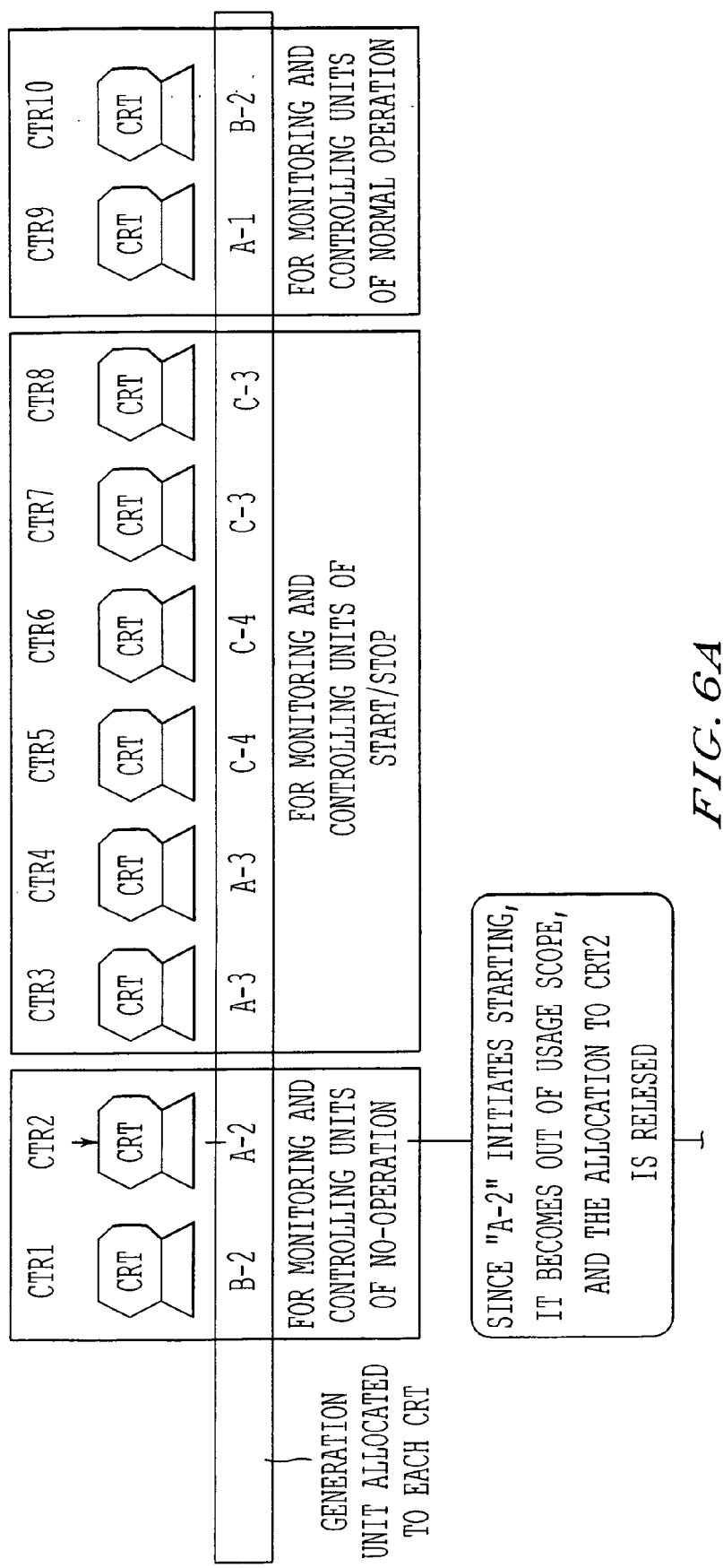
FIG. 6 is a diagram showing an example of a change in interface device allocation caused by a change in plant state in the general monitor-control system of power generation units shown in FIG. 1.
Figure 6B:
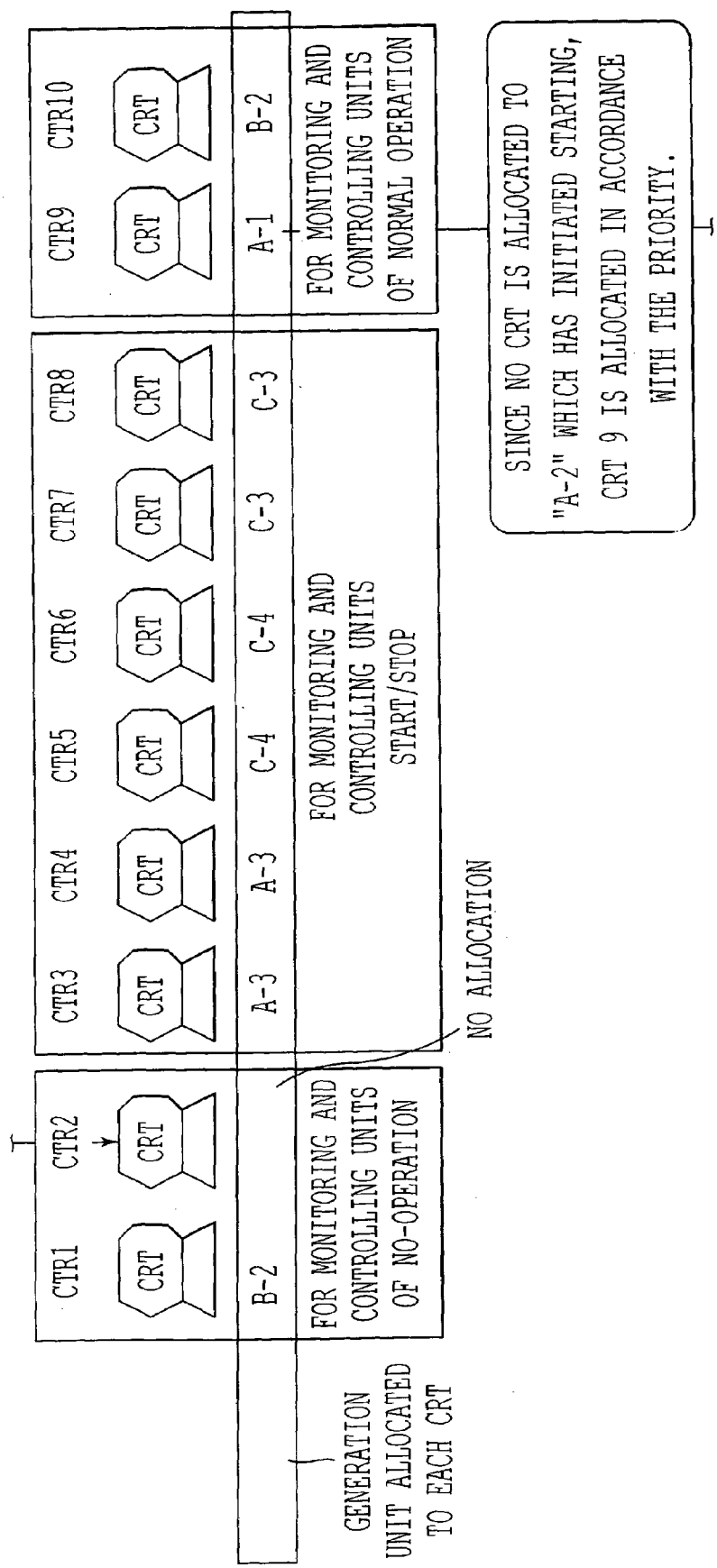
Figure 6C:
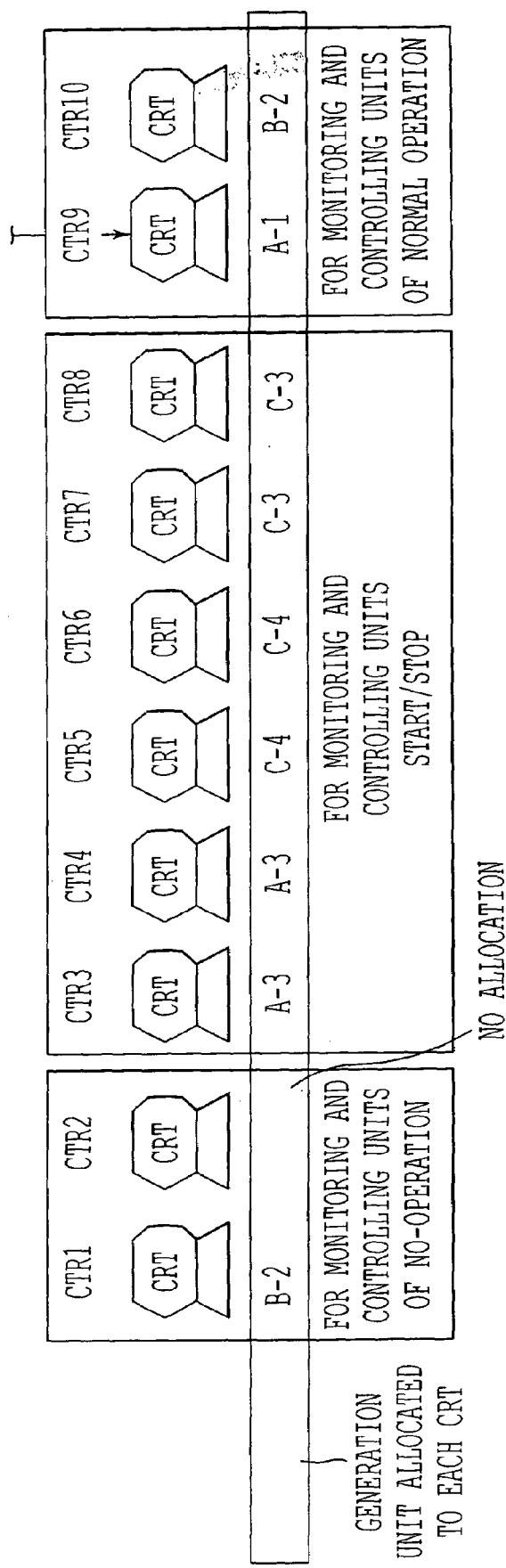

FIG. 6 is a diagram showing an interface device allocation change caused by a change in a generation unit state discussed above. FIG. 6 shows an example of centralized management where ten interface devices 11-1 through 11-10 are used for generally monitoring and operating six generation units A-1, A-2, A-3, B-2, C-3 and C-4.

At the firs stage shown in FIG. 6(a), the allocation of generation units A-1. A-2, . . . , C-4 to the interface devices 11-1 through 11-10 is the same as registered in the interface-device management database 17 of FIG. 1 (See FIG. 3). FIG. 6(a) shows the allocation relation between the interface devices and the generation units. Referring to this diagram from the left hand, as the interface devices for monitoring and controlling non-operational units, the interface device 1 is allocated to the generation unit B-2, and the interface device 2 is allocated to the generation unit A-2. As the interface devices for monitoring and controlling starting and stopping units, the interface devices 11-3 and 11-4 are allocated to the generation unit A-3. Likewise, the interface devices 11-5 and 11-6 are allocated to the generation unit C-4, and the interface devices 11-7 and 11-8 are allocated to the generation unit C-3. As the interface devices for monitoring and controlling normally operating units, the interface devices 11-9 is allocated to the generation unit A-1, and the interface device 11-10 is allocated to the generation unit B-2.

When the generation unit A-2 starts operation which has been in non-operation state in FIG. 6(*a*), the generation unit A-2 becomes out of the operation state which is covered by the interface device 11-2, and the allocation is canceled. FIG. 6(*b*) shows a situation when the allocation of the generation unit A-2 is canceled. At that time, "no allocation" is displayed under the interface device 11-2. At the same time, the interface device 11-9 is allocated to the generation unit A-2 based upon the automatic priority which has been registered in the interface-device management database 17 shown in FIG. 3, as shown in FIG. 6(*c*).

Now another embodiment of the generation unit general monitor-control system is explained. In this case, the automatic usage-rewriting device 23 has an allocation pattern table, as shown in FIG. 7, for example. This pattern table is referred to and the number of allocations of the interface devices in the pattern table and the number of allocations announcing signal "i" of the interface devices for the particular purpose is compared. If those numbers are different, the interface device usage-rewriting signal "j" is announced and the usages of the individual interface devices are changed. Thus, the optimum allocation of the interface devices is obtained for each operation state. The allocation pattern table shown in FIG. 7 is an example of allocation pattern where four units at most out of the ten units may be allocated to starting-stopping operations. The setting values in the pattern table are decided in the following concept.

The starting-stopping operation state requires largest number of monitoring and controlling items and largest number of CRTs among the unit operation states. Therefore, two CRTs are allocated to each of the generation units in starting-stopping operation state, and the generation units in normal operation state and in non-operation state are monitored on the rest of the CRTs. Besides, one CRT is allocated to each of the generation units under normal operation state if it is possible because the units under normal operation state have more items for monitoring and controlling than those under non-operating state. At least one CRT is allocated each to the group of units under normal operation state and to the group of units under non-operating state, if at least one unit is in the group, so that all the units are monitored.

The columns of "Units/CRTs" show the ratios of the numbers of units and the numbers of CRTs. According to this table, it is understood that two CRTs per unit are assured ("Units/CRTs"=0.5) if a unit is starting or stopping. It is also understood that one CRT is allocated to each generation unit which is under normal operation state if possible (units/CRTs=1.0) under the condition of assuring at least one CRT is allocated to the generation units in non-operation state if at least one unit is in non-operation state.

Suppose, for example, when the interface control database is in a state as shown in FIG. 8, the generation unit A-2 which has been in non-operation state begins starting operation to be changed into starting-stopping state. Then, the generation unit C-3 which has been in starting operation completes starting operation and is changed into normal operation state. In this case, the interface allocation condition changes as shown in FIG. 9.

Originally, the number of generation units in starting-stopping state is 3, the number of generation units in normal operation state is 2, and the number of generation units in non-operation state is 5, which is the condition of Pattern No. 13 stipulated in the allocation pattern table of FIG. 7. Then, the generation unit A-2 begins plant starting, changing into starting-stopping operation state. That results in a condition where the number of generation units in starting-stopping state is 4, the number of generation units in normal operation state is 2, and the number of generation units in non-operation state is 4, which is the condition of Pattern No. 5. At this time, the automatic usage-rewriting device 23 sends the interface-usage-rewriting signal "j". That results in an increase of the number of the CRTs for starting-stopping unit monitoring from six to eight so that each of the four units of starting-stopping units, which have increased, may be monitored and controlled by two CRTs. One of the two residual CRTs is used for monitoring the two units in normal operation while the other is for monitoring the four units in non-operation.

Then, the generation unit C-3, which has been in starting operation, completes starting operation, and changes into normal operation. At that time, the automatic usage-rewriting device 23 detects the condition change. The number of generation units in starting-stopping state becomes 3, the number of generation units in normal operation state becomes 3, and the number of generation units in non-operation state becomes 4, which is the condition of Pattern No. 12. Then, the automatic usage-rewriting device 23 sends the usage-rewriting signal "j". The number of the CRTs for monitoring the starting-stopping units decreases from eight to six. The two released CRTs are newly allocated to the generation units in normal operation, and each of the three units in normal operation is monitored and controlled using a CRT of its own.

Thus, even when the generation units have changed in their states, the interface devices are automatically allocated and the management can be conducted without causing errors of the operators.

As discussed above, according to the present invention, there is provided a system for generally monitoring and controlling a plurality of electric power generating units, where the allocation relation between the power generation units and the interface devices for monitoring and controlling is not fixed, but the relation can be changed in response to the operation conditions of the power generation units. Thus, a general controlling and monitoring system for electric power stations can be provided which can be operated with fewer operators efficiently and safely.

What is claimed is:

1. A generation unit general monitor-control system for generally monitoring and controlling a plurality of electric power generation units, the general monitor-control system allocating relations between a plurality of electric power generation units and a plurality of man-machine interface devices for monitoring and controlling the generation units so as to generally monitor and control the generation units through the man-machine interface devices, the general monitor-control system comprising:

a unit database including addresses stipulated for each of the generation units, and data portions corresponding to each of the addresses, the data portions configured to store process data and operation sianals of the generation units;

process input-output means for rewriting data in the data portion based upon input signals from the generation units, reading out the data in the data portion based upon demand from the man-machine interface device, and outputting the data to the generation units;

unit database input-output portion for receiving demands from the man-machine interface devices, detecting addresses of the generation units allotted to the man-machine interface devices, and referring to data portion corresponding to the addresses;

interface device designating means for designating man-machine interface devices out of the plurality of man-machine interface devices;

an interface-device-unit-relation rewriting device for rewriting the allocation relation between the generation unit and the man-machine interface devices based upon command from the interface device designating means; and an interface-device management database for storing information of the generation units to be monitored or operated through each of the plurality of man-machine interface devices, as a database, wherein the interface-device-unit-relation rewriting device is configured so as to refer to the interface-device-management database searching for ones able to be automatically allocated in automatic priority order and to switch over, after receiving allocation release notice.

2. A generation unit general monitor-control system for generally monitoring and controlling a plurality of electric power generation units, the general monitor-control system allocating relations between a plurality of electric power generation units and a plurality of man-machine interface devices for monitoring and controlling the generation units so as to generally monitor and control the generation units through the man-machine interface devices, the general monitor-control system comprising;

a unit database including addresses stipulated for each of the generation units, and data portions corresponding to each of the addresses, the data portions configured to store process data and operation signals of the generation units;

process input-output means for rewriting data in the data portion based upon input signals from the generation units, reading out the data in the data portion based upon demand from the man-machine interface device, and outputting the data to the generation units;

unit database input-output portion for receiving demands from the man-machine interface devices, detecting addresses of the generation units allotted to the man-machine interface devices, and referring to data portion corresponding to the addresses;

interface device designating means for designating man-machine interface devices out of the plurality of man-machine interface devices;

an interface-device-unit-relation rewriting device for rewriting the allocation relation between the generation unit and the man-machine interface devices based upon command from the interface device designating means;

an interface-device management database for storing information of the generation units to be monitored or operated through each of the plurality of man-machine interface devices, as a database; and a unit-state-decision-interface-device-allocation device re-allocating a man-machine interface device corresponding to the generation unit changing operation state by referring to the interface device management database, when the operation state of the generation unit has changed.

3. The generation unit general monitor-control system according to claim 2, wherein the generation units are allocated to the man-machine interface devices so as to enable the generation units to be operated through the man-machine interface devices by choosing one or more from a plurality of combinations of the generation units in non-operation state, the generation units in starting or in stopping state, or the generation units in loaded operation state.

4. The generation unit general monitor-control system according to claims 2 or 3, further comprising: means for allocating a different man-machine interface device for controlling and operating a new operation state when the generation unit has changed in operation state.

5. The generation unit general monitor-control system according to claims 2 or 3, further comprising:

interface-device operation-state storing means for storing operation state of the generation units allotted to the man-machine interfaces;

means for automatically changing allocation of the man-machine interface device, to which the other operation state of the generation units has been allocated, when a number of man-machine interface devices allocated to an operation state of the generation units has become smaller than a stipulated number.

6. The generation unit general monitor-control system according to claim 5, wherein the system is configured so as to change the operation states of the generation units allocated to the man-machine interface devices in accordance with a predetermined priority of automatic change in operation state of the generation units when the operation state of the generation units allocated to the man-machine interface device is automatically changed.

7. The generation unit general monitor-control system according to claims 2 or 3, further comprising:

interface-device operation-state storing means for storing operation states of the generation units allocated to each of the man-machine interface devices; and means for displaying an allocation change message when a number of the man-machine interface devices allocated to each one of the operation states of the generation unit becomes smaller than a pre-determined number.

* * * * *